US012393213B2

(12) United States Patent
Parthasarathy et al.

(10) Patent No.: US 12,393,213 B2
(45) Date of Patent: Aug. 19, 2025

(54) VOLTAGE REGULATOR

(71) Applicant: Texas Instruments Incorporated, Dallas, TX (US)

(72) Inventors: Harikrishna Parthasarathy, Bangalore (IN); Khyati Bansal, Sri Ganganagar (IN); Venkatesh Kadlimatti, Hubli (IN); Kunal Karanjkar, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 243 days.

(21) Appl. No.: 18/217,388

(22) Filed: Jun. 30, 2023

(65) Prior Publication Data

US 2025/0004492 A1 Jan. 2, 2025

(51) Int. Cl.

*G05F 1/56* (2006.01)
*G05F 1/565* (2006.01)
*G05F 1/575* (2006.01)
*G05F 1/595* (2006.01)

(52) U.S. Cl.

CPC .............. *G05F 1/565* (2013.01); *G05F 1/575* (2013.01); *G05F 1/595* (2013.01)

(58) Field of Classification Search

CPC ........... G05F 1/565; G05F 1/575; G05F 1/595

See application file for complete search history.

(56) References Cited

U.S. PATENT DOCUMENTS 7,728,569 B1 * 6/2010 Le ........................... G05F 1/575 323/280
10,996,700 B1 * 5/2021 Tan ......................... G05F 1/575
2014/0266103 A1 9/2014 Wang et al.
2021/0184573 A1 6/2021 Zhang et al.
2021/0203228 A1 * 7/2021 Liu ........................ H02N 13/00

FOREIGN PATENT DOCUMENTS

CN 114185384 A 3/2022
KR 102317348 B1 10/2021
WO 2021113563 A1 6/2021

OTHER PUBLICATIONS

International PCT Search Report for PCT/US2023/086237, dated May 1, 2024.

* cited by examiner

*Primary Examiner* — Jue Zhang
*Assistant Examiner* — Lakaisha Jackson
(74) *Attorney, Agent, or Firm* — Huang Xianghui; Frank D. Cimino

(57) ABSTRACT

Methods, apparatus, systems, and articles of manufacture are disclosed corresponding to a voltage regulator. An example circuit includes an output terminal; a first transistor including a current terminal and a control terminal coupled to an output terminal; a second transistor including a control terminal and a current terminal coupled to the control terminal of the first transistor; a third transistor including a first current terminal and a second current terminal, the first current terminal of the third transistor coupled to the output terminal; current mirror circuitry including a terminal coupled to the second current terminal of the third transistor; and inverter circuitry including an input terminal and an output terminal, the input terminal coupled to the terminal of the current mirror and the second current terminal of the third transistor, the output terminal coupled to the control terminal of the second transistor.

20 Claims, 7 Drawing Sheets

VOLTAGE REGULATOR

FIELD OF THE DISCLOSURE

This disclosure relates generally to circuits, and, more particularly, to a voltage regulator.

BACKGROUND

Voltage regulators (e.g., low dropout voltage regulators (LDOs)) provide a regulated output voltage based on a supply voltage using an amplifier and other circuitry. High performance voltage regulators are structured to attempt to output a stable, regulated voltage regardless of changes in a load (e.g., one or more devices and/or components connected to the voltage regulator), supply voltage, and/or temperature.

SUMMARY

In accordance with at least one example of the disclosure, a circuit includes an amplifier including an input terminal and an output terminal; a capacitor including a first terminal and a second terminal, the first terminal of the capacitor coupled to the input terminal of the amplifier, the second terminal of the capacitor coupled to the output terminal of the amplifier; and diode circuitry including a first terminal and a second terminal, the first terminal of the diode circuitry coupled to the first terminal of the capacitor and the input terminal of the amplifier, the second terminal of the diode circuitry coupled to the second terminal of the capacitor and the output terminal of the amplifier.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
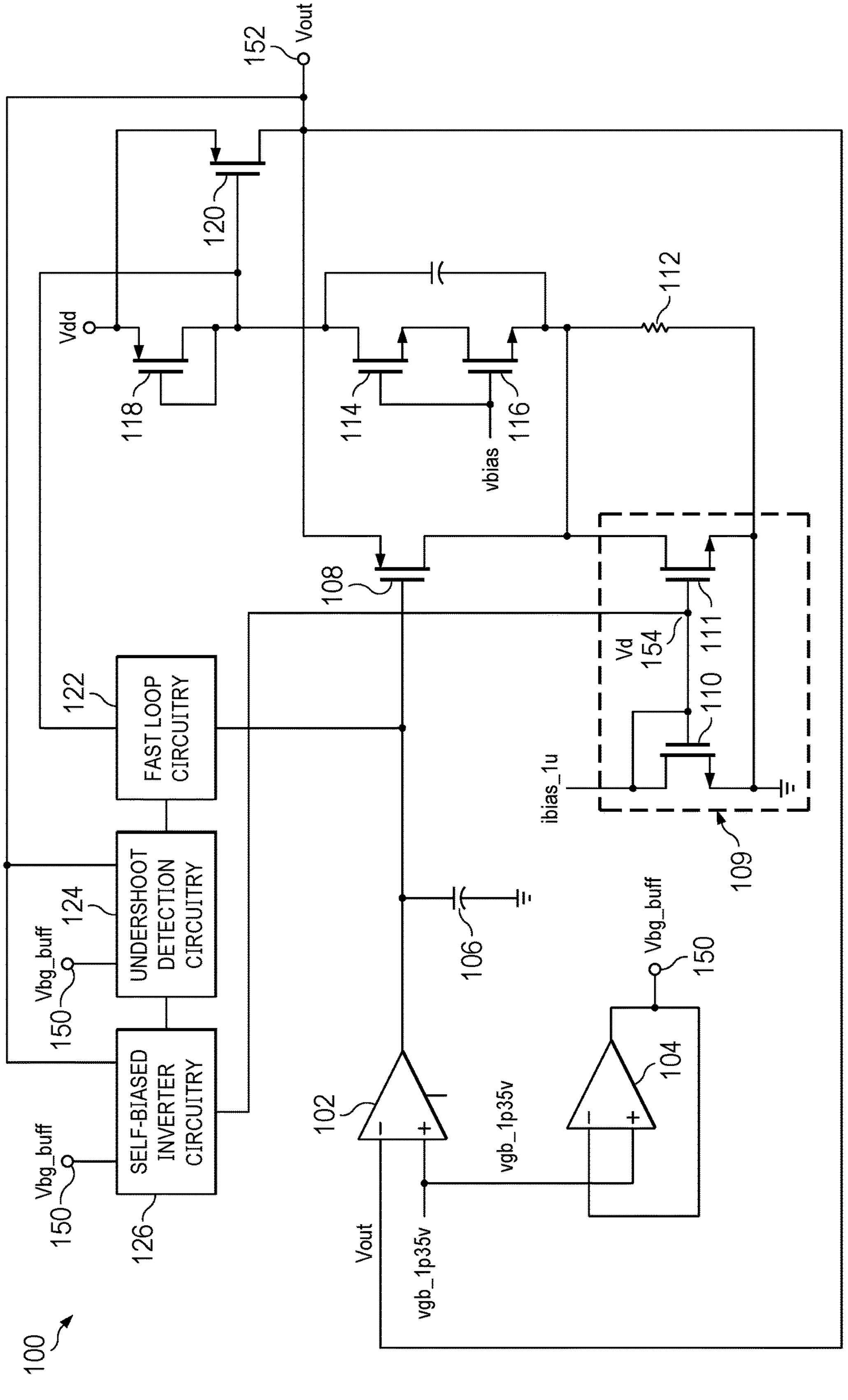
FIG. 1 is an example voltage regulator described in conjunction with examples disclosed herein.

The drawings are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

Some voltage regulators include a pin and/or terminal that is dedicated to a connection to an external capacitor. The external capacitor provides support for a transient response (e.g., a sudden change in the load that causes the output voltage of the voltage regulator to increase or decrease), power supply noise rejection, stability, etc. However, reserving a pin in a voltage regulator adds area, cost, and complexity to the voltage regulator and/or overall system. Accordingly, some voltage regulator circuits and/or packages remove the reserved pin for an external capacitor. Such voltage regulators are herein referred to as capless regulators, referring to their lack of an external capacitor despite possibly including other capacitors or elements with some measurable capacitance.

Some capless regulators suffer from poor transient performance because capless regulators do not include an external capacitor to support the transient load. Accordingly, when a transient condition occurs (e.g., a quick change in load), the output voltage of such capless regulators changes (e.g., reduces below the intended output voltage or increases above the intended output voltage) and takes time to regulate the output voltage back to the intended output voltage. The lower the change in output voltage and the quicker the recovery, the better the transient response and/or performance. Examples disclosed herein provide a capless regulator with similar transient response and/or performance to voltage regulators that are coupled to an external capacitor. Accordingly, examples disclosed herein provide capless-type regulators with the performance of a regulator with a dedicated capacitor pin with less space, cost, and/or complexity than the comparable regulator with the dedicated pin.

FIG. 1 illustrates an example regulator 100 (e.g., a capless LDO). The regulator 100 of FIG. 1 includes an amplifier 102, a buffer 104, a capacitor 106, transistors 108, 110, 111, 114, 116, 118, 120, a current mirror 109, a resistor 112, fast loop circuitry 122, undershoot detection circuitry 124, and self-biased inverter circuitry 126. As noted above, the regulator 100 may be considered a capless regulator because it lacks a particular type of external capacitor despite including, for example, capacitor 106 and/or other capacitors.

The example amplifier 102 of FIG. 1 is an error amplifier that amplifies a difference between a voltage output by the regulator 100 at the Vout node and/or terminal 152. The amplifier 102 includes an inverting input terminal, a noninverting input terminal, and an output terminal. The inverting input terminal of the amplifier 102 is coupled to the output terminal (Vout) 152 of the regulator 100, the self-biased inverter circuitry 126, the undershoot detection circuitry 124, the second current terminal of the transistor 120, and the first current terminal of the transistor 108. The noninverting input terminal of the amplifier 102 is coupled to the noninverting input terminal of the buffer 104 and structured to be coupled to a bandgap reference via a bandgap node (e.g., vbg_1p35v). The output terminal of the amplifier 102 is coupled to the first terminal of the capacitor 106, the fast loop circuitry 122, and the control terminal of the transistor 108. The amplifier 102 outputs a voltage corresponding to the difference between the voltage of the two input terminals. Accordingly, when the difference between the two input terminals is 0V, the amplifier 102 outputs 0V. If the output voltage is higher than the bandgap reference voltage, the amplifier 102 outputs a voltage to raise the on-resistance of the transistor 108. If the output voltage is lower than the bandgap reference voltage, the amplifier outputs a voltage to lower the on-resistance of the transistor 108.

The example buffer 104 of FIG. 1 is an operational amplifier that is configured to operate as a buffer. However, the buffer 104 can be implemented by other circuitry. The buffer 104 includes an inverting input terminal, a noninverting input terminal, and an output terminal. The inverting input terminal of the buffer 104 is coupled to the output terminal of the buffer 104 (e.g., the Vbg_buff) node 150. The Vbg-buff node 150 is coupled to the undershoot detection circuitry 124. The noninverting input terminal of the buffer 104 is coupled to the noninverting input terminal of the amplifier 102 and structured to be coupled to a bandgap reference (e.g., via bandgap node vbg_1p35v). The buffer 104 is structured to provide an output at the bandgap voltage that a current can be drawn from.

The example capacitor 106 filters high frequency noise to ground. The capacitor includes a first terminal and a second terminal. The first terminal of the capacitor 106 is coupled to the output terminal of the amplifier 102, the fast loop circuitry 122, and the control terminal of the transistor 108. The second terminal of the capacitor is coupled to a ground terminal.

In one example, the transistor 108 of FIG. 1 is a p-channel metal oxide semiconductor (PMOS) field effect transistor (FET). However, the transistor can be any type of transistor (e.g., a bipolar junction transistor (BJT), etc.). The transistor 108 includes two current terminals (e.g., a source terminal and a drain terminal) and a control terminal (e.g., a gate terminal). The first current terminal of the transistor 108 is coupled to the output terminal 152 (e.g., Vout) of the regulator 100, the self-biased inverter circuitry 126, and the inverting input terminal of the amplifier 102. The second current terminal of the transistor 108 is coupled to the first current terminal of the transistor 111 in the current mirror 109, the first terminal of the resistor 112 and the second current terminal of the transistor 116. The control terminal of the transistor 108 is coupled to the output terminal of the amplifier 102, the first terminal of the capacitor 106, and the fast loop circuitry 122. The transistor 108 is a source follower and the current of the transistor 108 (e.g., the current from the first current terminal to the second current terminal of the transistor 108) is based on the output voltage of the amplifier 102. In this manner, the amplifier 102 can adjust the output voltage so that the output voltage (e.g., fraction of the output voltage) matches the bandgap reference voltage.

The example current mirror 109 of FIG. 1 mirrors a bias current (e.g., 1 micro ampere (uA)) at a current terminal of the transistor 111. The current mirror 109 includes two terminals. The first terminal of the current mirror 109 is structured to be coupled to a current source that outputs a bias current. The second terminal of the current mirror 109 is coupled to the second current terminal of the transistor 108, the first terminal of the resistor 112 and the second current terminal of the transistor 116. The current mirror 109 includes the transistors 110, 111. The transistors 110, 111 are NMOS transistors. However, the transistor can be any type of transistor (e.g., BJTs, etc.). The transistors 110, 111 include two current terminals and a control terminal. The first current terminal of the transistor 110 is coupled to the control terminals of the transistors 110, 111 and the self-biased inverter circuitry 126 and is structured to be coupled to a current source that outputs a bias current. The second current terminal of the transistor 110 is coupled to a ground terminal. The control terminal of the transistor 110 is coupled to the first current terminal of the transistor 110, the control terminal of the transistor 111, and the self-biased inverter circuitry 126. The first current terminal of the transistor 111 is coupled to the second current terminal of the transistor 108, the first terminal of the resistor 112, and the second current terminal of the transistor 116. The second current terminal of the transistor 111 is coupled to the ground terminal. The control terminal of the transistor 111 is coupled to the first current terminal of the transistor 110, the control terminal of the transistor 110, and the self-biased inverter circuitry 126.

The example resistor 112 of FIG. 1 provides a path to ground for the transistors 108 and/or 116. The resistor 112 includes two terminals. The first terminal of the resistor 112 is coupled to the second current terminal of the transistor 108, the second current terminal of the transistor 116, and the second terminal of the current mirror 109 (e.g., the first current terminal of the transistor 111). The second terminal of the resistor 112 is coupled to the ground terminal. While shown as a single resistor in FIG. 1, the resistor 112 may be implemented using any combination of multiple resistors.

The example transistors 114, 116 of FIG. 1 are NMOS transistors that provide a path for the voltage at the control terminal of the transistor 120 to discharge to ground (e.g., via the resistor 112). However, the transistor 114, 116 can be any type of transistor. The transistors 114, 116 each include two current terminals and one control terminal. The first current terminal of the transistor 114 is coupled to the control terminals of the transistors 118, 120, the second current terminal of the transistor 118, and the fast loop circuitry 122. Additionally, the first current terminal of the transistor 114 is capacitively coupled (e.g., via a capacitor) to the second current terminal of the transistor 116. The second current terminal of the transistor 114 is coupled to the first current terminal of the transistor 116. The control terminal of the transistor 114 is coupled to the control terminal of the transistor 116 and is structured to be coupled to a bias voltage source. The first current terminal of the transistor 116 is coupled to the second current terminal of the transistor 114. The second current terminal of the transistor 116 is coupled to the first current terminal of the transistor 108, the first current terminal of the transistor 111 in the current mirror 109, and the first terminal of the resistor 112. Additionally, the second current terminal of the transistor 116 is capacitively coupled to the first current terminal of the transistor 114. The control terminal of the transistor 116 is coupled to the control terminal of the transistor 114 and is structured to be coupled to a bias voltage source.

The example transistor 118 of FIG. 1 is a diode-connected PMOS transistor that is connected to act as a diode. However, the transistor 118 can be any other type of transistor, diode circuitry, and/or a resistor. The transistor 118 includes two current terminals and a control terminal. The first current terminal of the transistor 118 is coupled to a supply terminal (e.g., that is structured to be coupled to a supply voltage). The second current terminal of the transistor 118 is coupled to the first current terminal of the transistor 114, the second current terminal of the transistor 116 (e.g., via a capacitive coupling), the control terminal of the transistor 120 and the fast loop circuitry 122. The voltage at the control terminal of the transistor 120 will be set by the negative feedback loop based on the load current. Thus, the transistor 118 acts like a load for taking the voltage drop generated by the emitter voltage feedback with the pass gate for a given load current.

The example transistor 120 of FIG. 1 is a power PMOS transistor used to provide additional current into the output terminal 152 of the regulator 100 whenever the output voltage drops (e.g., also referred to as undershoot) to increase and/or regulate the output voltage to the desired voltage based on the voltage applied to the control terminal of the transistor 120. The transistor 120 includes two current terminals and a control terminal. The first current terminal of the transistor 120 is coupled to a supply voltage terminal that is structured to be coupled to a supply voltage. The second current terminal is coupled to the output terminal (Vout) 152 of the regulator 100, the inverting input terminal of the amplifier 102, the first current terminal of the transistor 108, the undershoot detection circuitry 124, and the self-biased inverter circuitry 126. When the voltage at the output terminal (Vout) 152 drops, the error amplifier 102 has a large capacitor at the output terminal of the amplifier 102. Thus, the output voltage of the error amplifier 102 does not change quickly. Accordingly, the source-to-gate voltage (VSG) of transistor 108 reduces and current through the transistor 108 (e.g., the current from the first current terminal to the second current terminal of the transistor 108) reduces, while the current through the transistor 111 is fixed. Thus, the current through the transistor 116 will increase, thereby pulling the voltage at the control terminal of transistor 120 down to ground causing the transistor 120 to increase a current (e.g., a charging current) provided into the output terminal (Vout) 152 of the regulator 100, thereby increasing the output voltage at the output terminal 152 of the regulator 100.

The example fast loop circuitry 122 of FIG. 1 creates a fast reaction to a change in load to increase the transient response and/or performance by increasing the voltage at the control terminal of the example transistors 108 and decreasing the voltage at control terminal of the transistor 120 in response to the output voltage decreasing below the regulated voltage. Although the feedback loop corresponding to the amplifier 102 can control the transistor 108 to regulate the output voltage in response to an increase or decrease, the response time of the amplifier 102 may be relatively slow. Thus, a quick change in the load can cause the output voltage to drop by 100 mV due to the lag in the amplifier feedback loop. The fast loop circuitry 122 is operational to quickly react to a change in the load and jump start operation of the transistors 108, 120 before the amplifier 102 has time to react to the change in the load. For example, in response to a voltage undershoot of the output voltage, the fast loop circuitry 122 can initiate the pulling down of the gate of the transistor 120 to initiate a recover from the undershoot quickly. Additionally, the fast loop circuitry 122 can provide current into the output of the amplifier 102 to decrease the current through the transistor 108 to increase the voltage at the output terminal 152 of the regulator 100. The fast loop circuitry 122 includes three terminals. The first terminal is coupled to the control terminals of the transistors 118, 120, the second current terminal of the transistor 118, the first current terminal of the transistor 114 and the second current terminal of the transistor 116 (e.g., via capacitive coupling). The second terminal of the fast loop circuitry 122 is coupled to the output of the amplifier 102, the first terminal of the capacitor 106, and the control terminal of the transistor 108. The third terminal of the fast loop circuitry 122 is coupled to the undershoot detection circuitry 124. A circuit implementation of the fast loop circuitry 122 is further described below in conjunction with FIG. 5.

The example undershoot detection circuitry 124 of FIG. 2 detects an undershoot and/or voltage drop of the output voltage below the intended, regulated output voltage. The undershoot detection circuitry 124 outputs a signal indicative of the detection of the undershoot to the fast loop circuitry 122. The undershoot detection circuitry 124 utilizes current mirrors, an inverter, capacitive coupling, and/or a voltage clamp to increase the seep at which undershoot can be detected. The undershoot detection circuitry 124 includes four terminals. The first terminal of the undershoot detection circuitry 124 is coupled to the fast loop circuitry 122. The second terminal of the undershoot detection circuitry 124 is coupled to the output terminal (Vout) 152 of the regulator 100. The third terminal of the undershoot detection circuitry 124 is coupled to the output terminal of the buffer 104 (e.g., via the vbg_buff node 150). The fourth terminal of the undershoot detection circuitry 124 is coupled to the self-biased inverter circuitry 126. Example circuit implementations of the undershoot detection circuitry 124 are further described below in conjunction with FIGS. 2-4.

The example self-biased inverter circuitry 126 of FIG. 1 increases the transient response to an output voltage dip by inverting the voltage dip, amplifying the voltage dip, to increase discharging of nodes in the current mirror 109 and/or the undershoot detection circuitry 124 to increase detection and/or mitigation of a voltage dip. The self-biased inverter circuitry 126 includes four terminals. The first terminal of the self-biased inverter circuitry 126 is coupled to the output terminal (Vout) 152 of the regulator 100. The second terminal of the self-biased inverter circuitry 126 is coupled to the undershoot detection circuitry 124. The third terminal of the self-biased inverter circuitry 126 is coupled to the control terminals of the transistors 110, 111 in the current mirror 109. The fourth terminal of the self-biased inverter circuitry 126 is coupled to the output terminal of the buffer 104 (e.g., via the vbg_buff node 150). An example circuit implementation of the self-biased inverter circuitry is further described below in conjunction with FIG. 6.

In operation, when the output voltage at the Vout terminal 152 (e.g., also at the inverting terminal of the amplifier 102) is smaller than the bandgap voltage at the noninverting terminal of the amplifier 102, the amplifier 102 increases its output voltage. The increased output voltage of the amplifier 102 causes the on-resistance of the transistor 108 to lower, the current through the transistors 114, 116, 118 to increase, and the current at the control terminal of the transistor 120 to increase. The increased current at the control terminal of the transistor 120 will pull down (e.g., discharge) the voltage at the control terminal of the transistor 120 to increase the current drawing from the supply voltage, thereby increasing the output voltage at the output terminal 152. The self-biased inverter circuitry 126, the undershoot detection circuitry 124, and/or the fast loop circuitry 122 increase the speed at which compensation for a voltage undershoot occurs thereby reducing the amount of voltage undershoot caused by a change in the load. For example, the self-biased inverter circuitry 126, the undershoot detection circuitry 124, and/or the fast loop circuitry 122 can aid in the discharging of the gate of the transistor 120 to increase the speed at which the transistor 120 can provide current into the output terminal 152 of the regulator 100 to mitigate a voltage undershoot.

Figure 2:
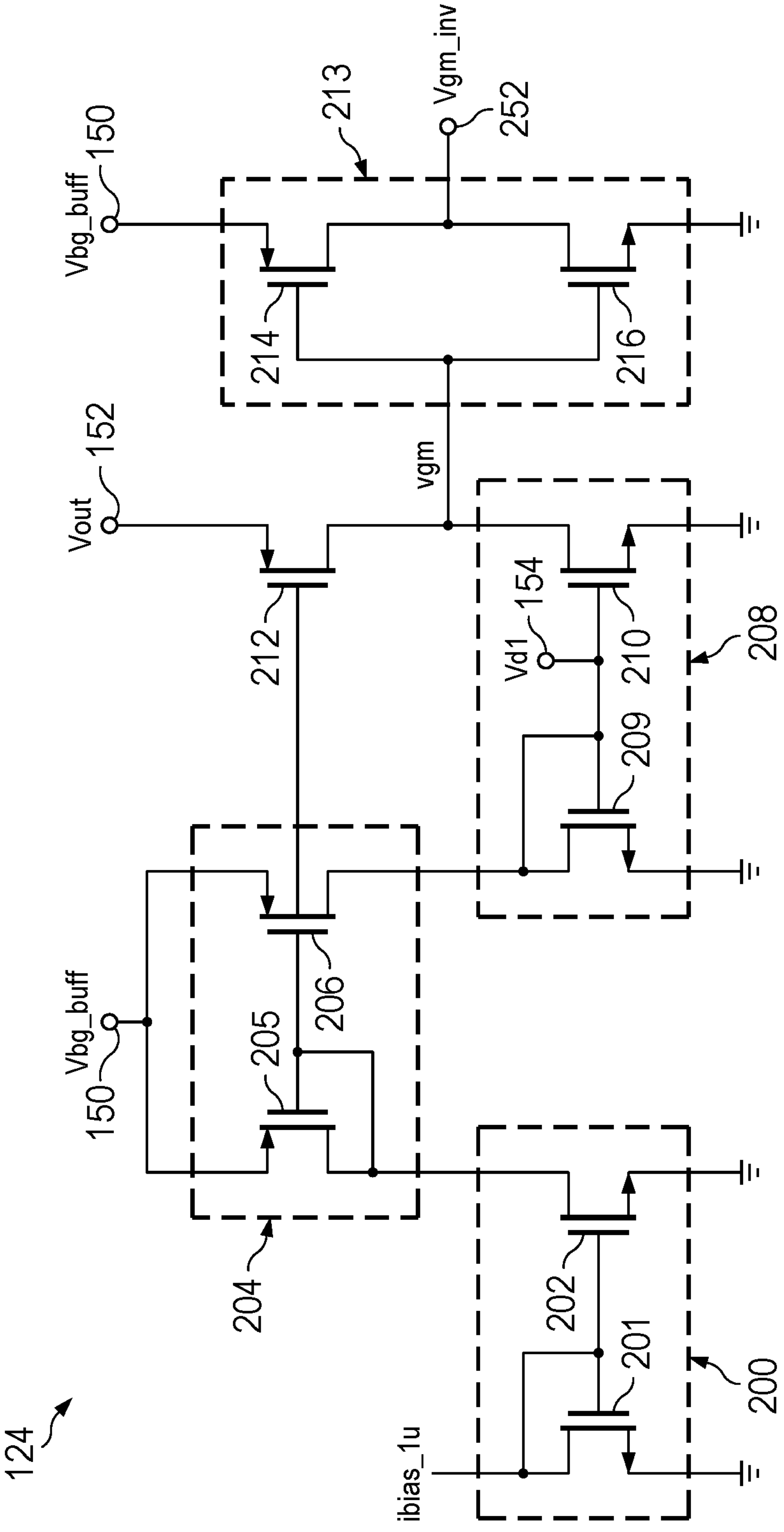
FIG. 2 is an example circuit implementation of undershoot detection circuitry of FIG. 1.

FIG. 2 is a circuit diagram of one example of the undershoot detection circuitry 124 shown in FIG. 1. The undershoot detection circuitry 124 in the example of FIG. 2 includes example current mirrors 200, 204, and 208; example transistors 201, 202, 205, 206, 209, 210, 212, 214, and 216; and an example inverter 213.

The example current mirrors 200, 204, and 208 mirror a bias current from a bias current source (e.g., via the ibas_1u node) to the second terminal of the current mirror 208 (e.g., the first current terminal of the transistor 210). In some examples, the bias current is 1 uA. However, the bias current can be any current based on the characteristics of the regulator 100. The first current mirror 200 includes the transistors 201, 202. The transistors 201, 202 are NMOS transistors. However, the transistors 201, 202 could be any type of transistor. The transistors 201, 202 include two current terminals and a control terminal. The first current terminal of the transistor 201 is coupled to the control terminals of the transistors 201, 202 and is structured to be coupled to the bias current source. The second current terminal of the transistor 201 is coupled to the ground terminal. The control terminal of the transistor 201 is coupled to the first current terminal of the transistor 201, the control terminal of the transistor 202 and is structured to be coupled to the bias current source. The first current terminal of the transistor 202 is coupled to the second current terminal of the transistor 205 of the current mirror 204, and the control terminals of the transistors 205, 206, 212. The second current terminal of the transistor 202 is coupled to the ground terminal. The control terminal of the transistor 202 is coupled to the control terminal of the transistor 201, the first current terminal of the transistor 201 and is structured to be coupled to the bias current source.

The example second current mirror 204 includes the transistors 205, 206. According to the example, the transistors 205, 206 are PMOS transistors. However, the transistors 205, 206 could be any type of transistor. The transistors 205, 206 each include two current terminals and a control terminal. The first current terminal of the transistor 205 is coupled to the output terminal of the buffer 104 via the Vbg_buff node 150. The second current terminal of the transistor 205 is coupled to the control terminals of the transistors 205, 206, 212, and the second current terminal of the transistor 202. The control terminal of the transistor 205 is coupled to the second current terminal of the transistor 205, the control terminal of the transistors 206, 212, and the first current terminal of the transistor 202. The first current terminal of the transistor 206 is coupled to the output terminal of the buffer 104 via the vbg_buff node 150. The second current terminal of the transistor 206 is coupled to the first current terminal of the transistor 209 of the current mirror 208, and the control terminals of the transistors 209, 210. The control terminal of the transistor 206 is coupled to the control terminal of the transistor 205, and the second current terminal of the transistor 205.

The example first current mirror 208 includes the transistors 209, 210. The transistors 209, 210 of the example are NMOS transistors. However, the transistors 209, 210 could be any type of transistor. The transistors 209, 210 include two current terminals and a control terminal. The first current terminal of the transistor 209 is coupled to the control terminals of the transistors 209, 210 and the second current terminal of the transistor 206. The second current terminal of the transistor 209 is coupled to the ground terminal. The control terminal of the transistor 209 is coupled to the first current terminal of the transistor 209, the control terminal of the transistor 210, and the second current terminal of the transistor 206. The first current terminal of the transistor 210 is coupled to the second current terminal of the transistor 212 and control terminals of the transistors 214, 216 of the inverter 213. The second current terminal of the transistor 210 is coupled to the ground terminal. The control terminal of the transistor 210 is coupled to the control terminal of the transistor 209, and the first current terminal of the transistor 209.

The example transistor 212 of FIG. 2 is a PMOS transistor that allows the a current from the output terminal (Vout) 152 of the regulator 100 to flow toward the vgm node. The transistor 212 includes two current terminals and a control terminal. The first current terminal of the transistor 212 is coupled to the output terminal (Vout) 152 of the regulator 100. The second current terminal of the transistor 212 is coupled to the first current terminal of the transistor 210 of the current mirror 208, and the control terminals of the transistors 214, 216 of the inverter 213. The control terminal of the transistor 212 is coupled to the control terminals of the transistor 205, 206, the second current terminal of the transistor 205 and the first current terminal of the transistor 202.

The example inverter 213 of FIG. 2 inverts the voltage at the vgm node (e.g., from a low voltage to a high voltage or from a high voltage to a low voltage), which is output to the fast loop circuitry 122 via the vgm_inv node 252. The inverter 213 of the example includes the transistors 214, 216. The transistor 214 is a PMOS transistor and the transistor 216 is an NMOS transistor. However, the transistors 214, 216 can be any type of transistor. The transistors 214, 216 each include two current terminals and a control terminal. The first current terminal of the transistor 214 is coupled to the output terminal of the buffer 104 of FIG. 1 via the vbg_buff node 150. The second current terminal of the transistor 214 is coupled to the first current terminal of the transistor 216 and the fast loop circuitry 122 (e.g., via the vgm_inv node 252). The control terminal of the transistor 214 is coupled to the control terminal of the transistor 216, the second current terminal of the transistor 212, and the first current terminal of the transistor 210. The first current terminal of the transistor 216 is coupled to the second current terminal of the transistor 214 and the fast loop circuitry 122 (e.g., via the vgm_inv node 252). The second current terminal of the transistor 216 is coupled to the ground terminal. The control terminal of the transistor 216 is coupled to the control terminal of the transistor 214, the second current terminal of the transistor 212, and the first current terminal of the transistor 210.

In operation, when the output voltage is at or above the desired and/or regulated output voltage, the current from the output terminal (Vout) 152 (e.g., 2 uA) is biased to a higher current than the bias current (e.g., 1 uA) mirrored by the current mirrors 200, 204, 208. Thus, the current drawn into the current mirror 208 is less than the current provided in from the output terminal (Vout) 152 (e.g., via the transistor 212). Accordingly, the excess current will be provided into the inverter 213 generating a high voltage at the input of the inverter 213 that generates a low voltage at the output of the inverter 213 (e.g., via the vgm_inv node 252). When there is a voltage dip at the output terminal (Vout) 152, the current from the output terminal decreases. When the current through the transistor 212 decreases below the bias current mirrored by the current mirrors 200, 204, 208, a current at the input terminal of the inverter 213 is drawn to ground, thereby decreasing the voltage at the vgm node. Thus, the output of the vgm_inv node 252 is increased to trigger the discharging of the control terminal of the example transistor 120 of FIG. 1, as further described below in conjunction with FIG. 5.

Figure 3:
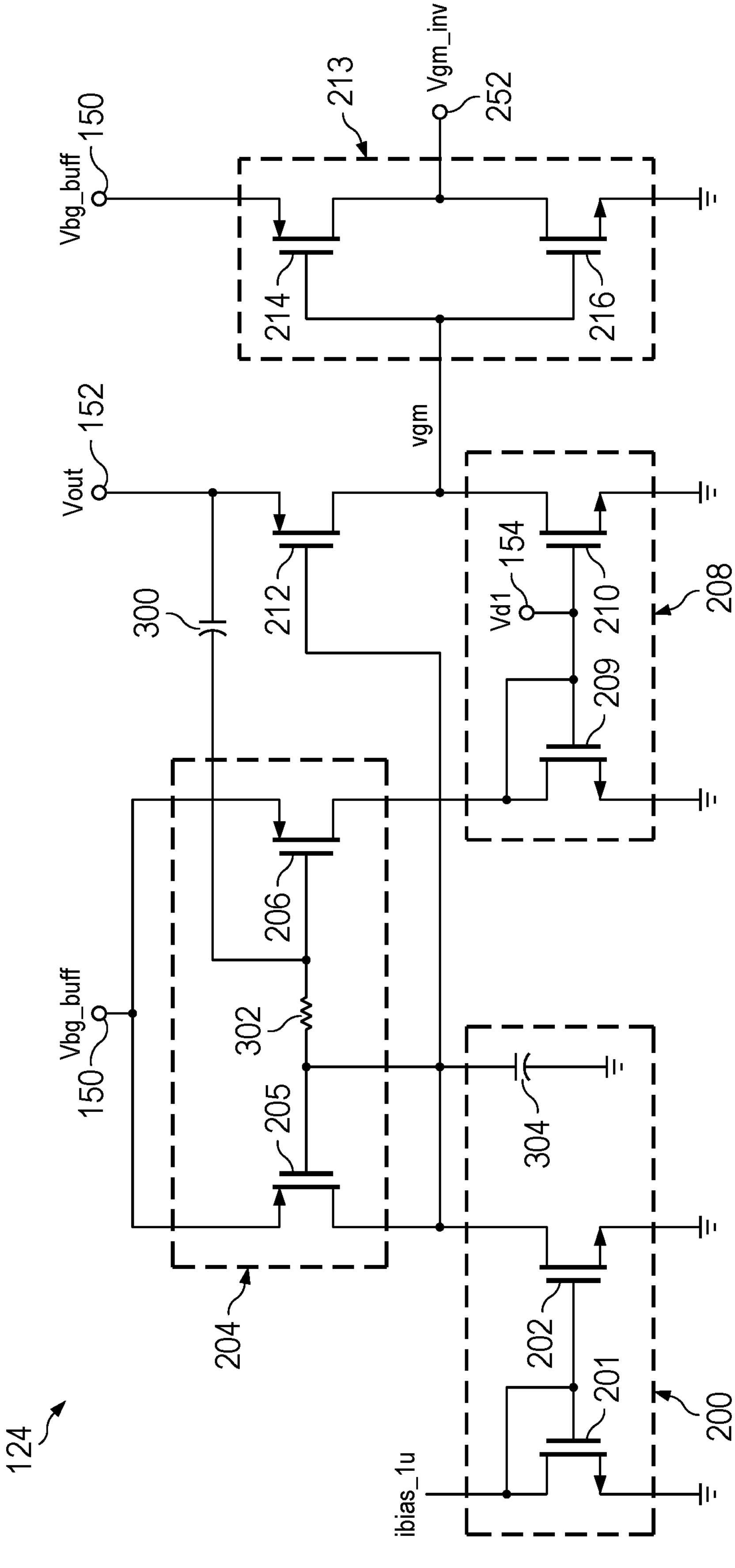
FIG. 3 is an additional example circuit implementation of undershoot detection circuitry of FIG. 1.

FIG. 3 is a circuit diagram showing an additional example of the undershoot detection circuitry 124 shown in FIG. 1. The undershoot detection circuitry 124 of FIG. 3 includes the example current mirrors, 200, 204, 208, the example transistors 201, 202, 205, 206, 209, 210, 212, 214, 216, and the example inverter 213 of FIG. 2. The example undershoot detection circuitry 124 of FIG. 3 further includes example capacitors 300, 304 and an example resistor 302.

The undershoot detection circuitry 124 of FIG. 3 operates in a similar manner to the undershoot detection circuitry 124 of FIG. 2. However, the output terminal (Vout) 152 of the regulator 100 is capacitively coupled to the control terminals of the transistors 205, 206 to increase the speed of undershoot detection. For example, when the output voltage at the output voltage terminal (Vout) 152 drops below the intended regulated voltage, the voltage at the gate of the transistor 206 reduces, which increases the current output at the second current terminal of the transistor 206. Thus, the increased current is mirrored by the transistors 209, 210 so that the current through the transistor 210 increases as the output voltage decreases. In this manner, the current into the inverter 213 will discharge toward ground via the transistor 210 faster. Accordingly, the inverter 213 will output a high voltage in response to a voltage drop at the output terminal (Vout) 152 faster than the undershoot detection circuitry 124 of FIG. 2. The resistor 302 and the capacitor 304 avoid disturbances to the other transistor(s) 201, 202, 205 to ensure that there is no dip in voltage and/or current at the gates of the other transistor(s) 201, 202, 205.

The example capacitor 300 of FIG. 3 includes two terminals. The first terminal of the capacitor 300 is coupled to the output terminal (Vout) 152 of the regulator 100 and the first current terminal of the transistor 212. The second current terminal of the capacitor 300 is coupled to the first terminal of the resistor 302 and the control terminal of the transistor 206. The resistor 302 includes two terminals. The first terminal of the resistor 302 is coupled to the second capacitor 300 and the control terminal of the transistor 206. The second terminal of the resistor 302 is coupled to the first terminal of the capacitor 304, the first current terminal of the transistor 202, the second current terminal of the transistor 205, the control terminal of the transistor 212, and the control terminal of the transistor 205. The capacitor 304 includes two terminals. The first terminal of the capacitor 304 is coupled to the second terminal of the resistor 302, the first current terminal of the transistor 202, the second current terminal of the transistor 205, the control terminal of the transistor 212, and the control terminal of the transistor 205. The second terminal of the capacitor 304 is coupled to the ground terminal.

Figure 4:
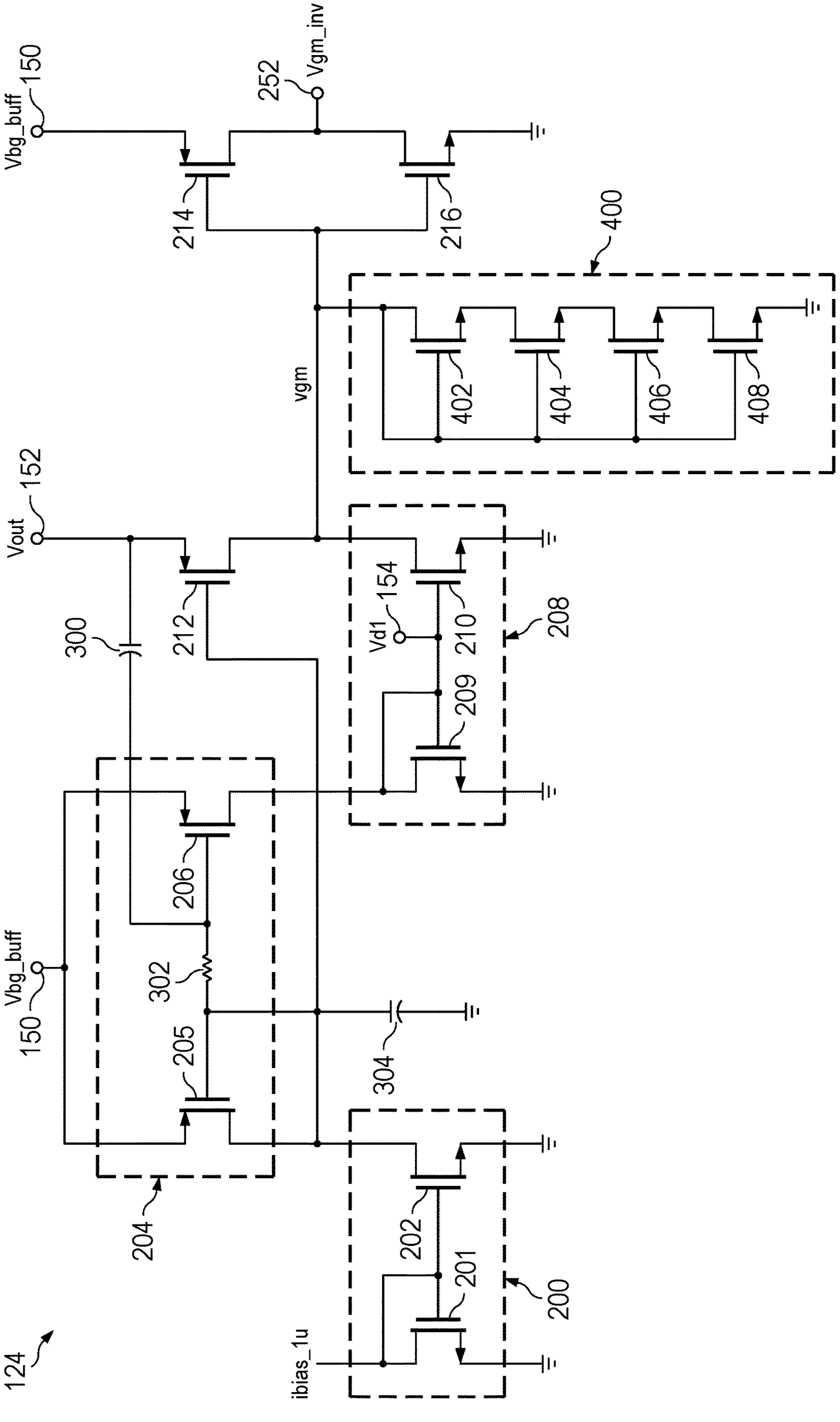
FIG. 4 is an additional example circuit implementation of undershoot detection circuitry of FIG. 1.

FIG. 4 is a circuit diagram of an additional example of the undershoot detection circuitry 124 shown in FIG. 1. The undershoot detection circuitry 124 of FIG. 4 includes the example current mirrors, 200, 204, 208, the example transistors 201, 202, 205, 206, 209, 210, 212, 214, 216, and the example inverter 213 of FIG. 2. The example undershoot detection circuitry 124 of FIG. 4 further includes the example capacitors 300, 304 and the example resistor 302. The example undershoot detection circuitry 124 further includes the example voltage clamp 400, which includes the example transistors 402, 404, 406, 408.

The undershoot detection circuitry 124 of FIG. 4 operates in a similar manner to the undershoot detection circuitries 124 of FIGS. 2 and/or 3. However, the undershoot detection circuitry 124 includes the voltage clamp 400 to cap and/or clamp the voltage at the vgm node to a voltage below the output voltage at the output terminal (Vout) 152 of the regulator 100. By capping the voltage at the vgm node to a voltage below the Vout voltage, the amount of voltage needed to be discharged to ground via the transistor 210 is smaller than in the undershoot detection circuitry 124 of FIGS. 2 and/or 3. A smaller voltage discharge results in the inverter 213 triggering a high voltage at the vgm_inv node 252 faster, which corresponds to a quicker transient response with a smaller voltage dip at the output voltage terminal (Vout) 152 in response to a change in load.

The voltage at the vgm node is capped to a voltage based on the number of transistors 402, 404, 406, 408 in the voltage clamp 400. Although there are four transistors 402, 404, 406, 408 in the voltage clamp 400, there may be any number of transistors coupled in series between vgm and ground based on the desired voltage cap. The transistors 402, 404, 406, 408 include two current terminals and a control terminal. The first current terminal of the transistor 402 is coupled to the second current terminal of the transistor 212, the control terminals of the transistors 402, 404, 406, 408, the first current terminal of the transistor 210, and the control terminals of the transistor 214, 216 via the vgm node. The second current terminal of the transistor 402 is coupled to the first current terminal of the transistor 404. The control terminal of the transistor 402 is coupled to the second current terminal of the transistor 212, the control terminals of the transistors 404, 406, 408, the first current terminal of the transistor 210, and the control terminals of the transistor 214, 216 via the vgm node. The first current terminal of the second transistor 404 is coupled to the second current terminal of the transistor 402. The second current terminal of the transistor 404 is coupled to the first current terminal of the transistor 406. The control terminal of the transistor 404 is coupled to the second current terminal of the transistor 212, the control terminals of the transistors 402, 406, 408, the first current terminal of the transistor 210, and the control terminals of the transistor 214, 216 via the vgm node. The first current terminal of the third transistor 406 is coupled to the second current terminal of the transistor 404. The second current terminal of the transistor 406 is coupled to the first current terminal of the transistor 408. The control terminal of the transistor 406 is coupled to the second current terminal of the transistor 212, the control terminals of the transistors 402, 404, 408, the first current terminal of the transistor 210, and the control terminals of the transistor 214, 216 via the vgm node. The first current terminal of the fourth transistor 408 is coupled to the second current terminal of the transistor 406. The second current terminal of the transistor 408 is coupled to the ground terminal. The control terminal of the transistor 406 is coupled to the second current terminal of the transistor 212, the control terminals of the transistors 402, 404, 406, the first current terminal of the transistor 210, and the control terminals of the transistor 214, 216 via the vgm node.

Figure 5:
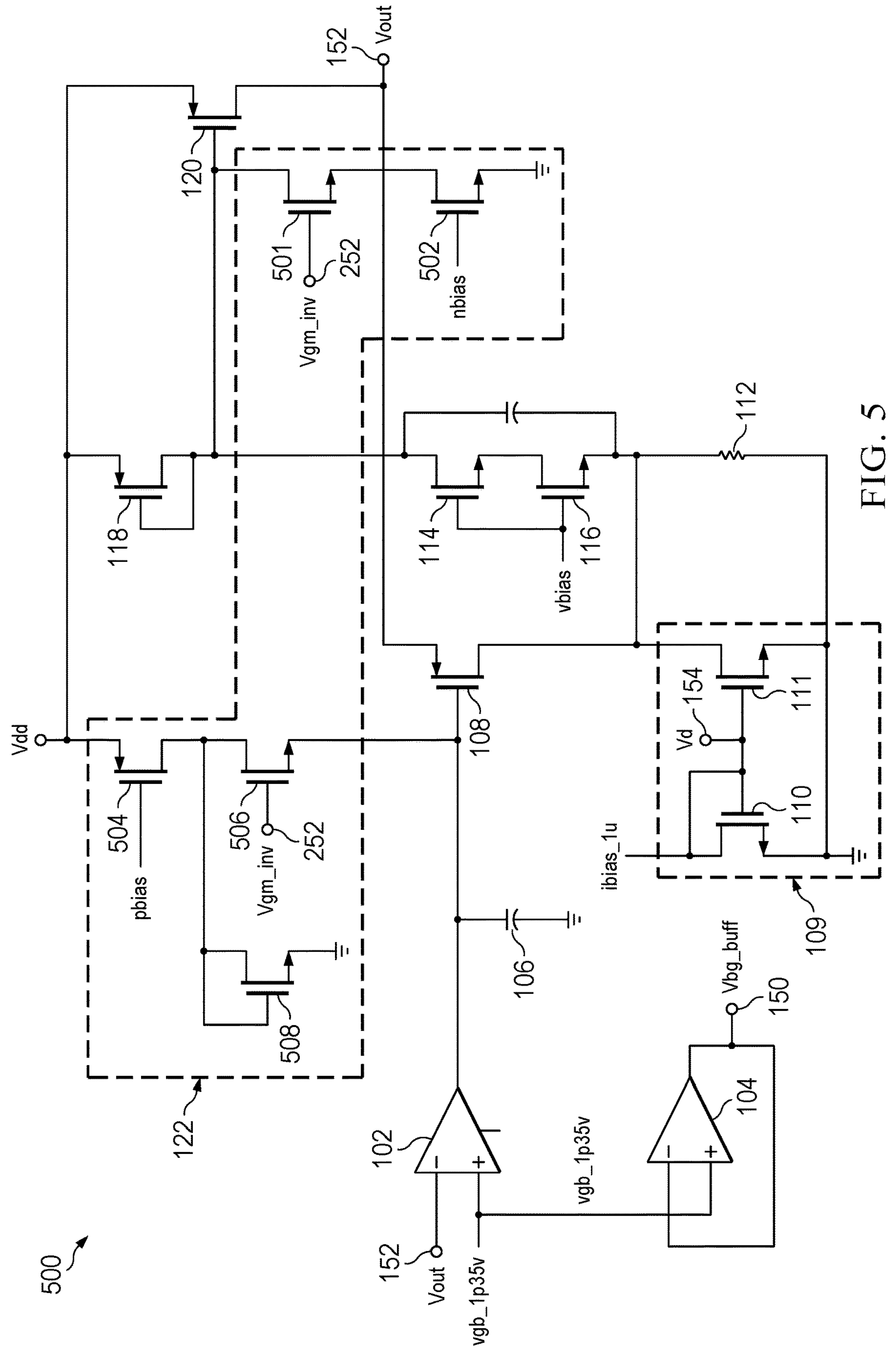
FIG. 5 illustrates the voltage regulator of FIG. 1 including a circuit implementation of the fast loop circuitry of FIG. 1.

FIG. 5 illustrates an example regulator 500 (e.g., a capless LDO) corresponding to the regulator 100 of FIG. 1 and illustrating a circuit implementation of the fast loop circuitry 122 therein. The regulator 500 of FIG. 5 includes the example amplifier 102, the example buffer 104, the example capacitor 106, the example transistors 108, 110, 111, 114, 116, 118, 120, the example current mirror 109, the example resistor 112, and the example fast loop circuitry 122 of FIG. 1. The regulator 500 of FIG. 5 further includes example transistors 501, 502, 504, 506, 508.

The transistor 501 of FIG. 5 enables (e.g., turns on, creates a short circuit between the two current terminals, etc.) when the voltage at the vgm_inv node 252 is above a threshold voltage (e.g., when a voltage undershoot has been detected). Enabling the transistor 501 provides a path to ground (e.g., via the transistor 502) to discharge the voltage at the gate of the transistor 120. As described above, discharging the voltage at the gate of the transistor 120 increases the charge current output at the second current terminal of the transistor 120 to mitigate a voltage dip at the output voltage terminal. The transistor 501 is a NMOS transistor with two current terminals and a control terminal. However, the transistor 501 can be any type of transistor. The first current terminal of the transistor 501 is coupled to the control terminals of the transistors 120, 118, the second current terminal of the transistor 118, the first current terminal of the transistor 114, and the second current terminal of the transistor 116 (e.g., via capacitive coupling). The second current terminal of the transistor 501 is coupled to the first current terminal of the transistor 502. The control terminal of the transistor 501 is coupled to the output terminal of the inverter 213 of the undershoot detection circuitry 124 (e.g., the second current terminal of the transistor 214 and the first current terminal of the transistor 216) via the vgm_inv node 252.

The transistor 502 is an NMOS transistor that provides a path for the voltage at the control terminal of the transistor 120 to discharge toward ground when the transistor 501 is enabled. The transistor 502 includes two current terminals and a control terminal. The first current terminal of the transistor 502 is coupled to the second current terminal of the transistor 501. The second current terminal of the transistor 502 is coupled to the ground terminal. The control terminal of the transistor 502 is structured to be coupled to a bias voltage supply.

The transistor 506 of FIG. 5 enables (e.g., turns on, creates a short circuit between the two current terminals, etc.) when the voltage at the vgm_inv node 252 is above a threshold voltage (e.g., when a voltage undershoot has been detected). Enabling the transistor 506 provides a path from the voltage supply to the control terminal of the transistor 108 to charge the voltage at the control terminal of the transistor 108. As described above, charging the voltage at the control terminal of the transistor 108 decreases the current through the transistor 108, which pulls the voltage at the resistor 112 low. Pulling the voltage at the resistor 112 low increases the current through the transistors 114, 116, which aids in discharging the voltage at the control terminal of the transistor 120. The transistor 506 is a NMOS transistor with two current terminals and a control terminal. However, the transistor 506 can be any type of transistor. The first current terminal of the transistor 506 is coupled to the first current terminal and the control terminal of the transistor 508 and the second current terminal of the transistor 504. The second current terminal of the transistor 506 is coupled to the output terminal of the amplifier 102, the first terminal of the capacitor 106, and the control terminal of the transistor 108. The control terminal of the transistor 506 is coupled to the output terminal of the inverter 213 of the undershoot detection circuitry 124 (e.g., the second current terminal of the transistor 214 and the first current terminal of the transistor 216) via the vgm_inv node 252.

The transistor 504 is an NMOS transistor that provides a path for the supply voltage to charge the control terminal of the transistor 108 when the transistor 506 is enabled. The transistor 504 includes two current terminals and a control terminal. The first current terminal of the transistor 504 is structured to be coupled to the supply voltage (e.g., via a supply voltage terminal). The second current terminal of the transistor 504 is coupled to the first current terminal and the control terminal of the transistor 508 and the first current terminal of the transistor 506. The control terminal of the transistor 504 is structured to be coupled to a bias voltage supply.

The transistor 508 is a diode connected transistor 508 that acts as a voltage clap to improve the reliability of the regulator 500. The transistor 508 includes two current terminals and a control terminal. The first current terminal of the transistor 508 is coupled to the control terminal of the transistor 508, the second current terminal of the transistor 504, and the first current terminal of the transistor 506. The second current terminal of the transistor 508 coupled to a ground terminal. The control terminal of the transistor is coupled to the first current terminal of the transistor 508, the second current terminal of the transistor 504, and the first current terminal of the transistor 506.

Figure 6:
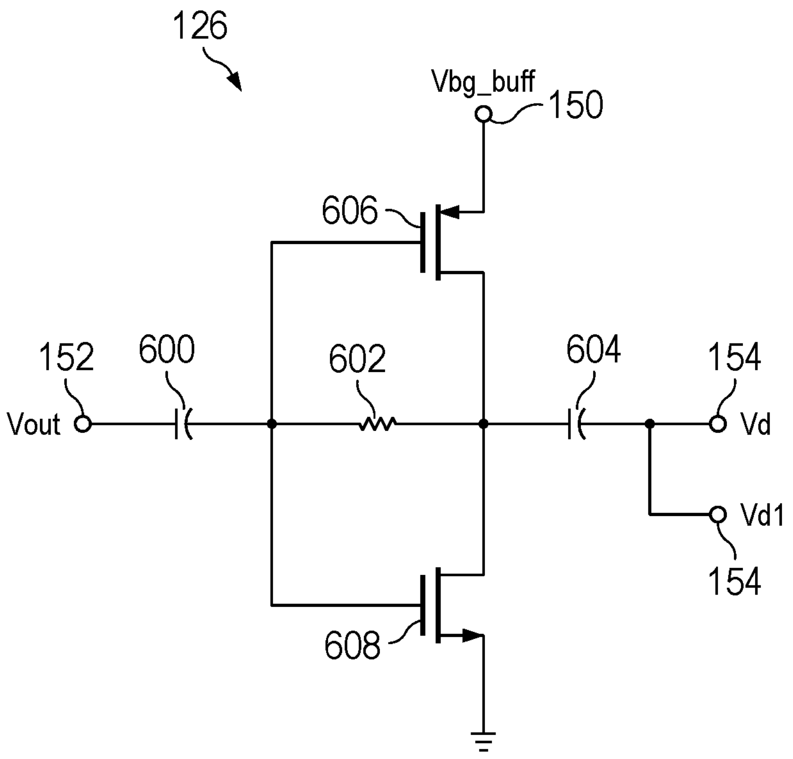
FIG. 6 is an example circuit implementation of the self-biased inverter circuitry of FIG. 1.

FIG. 6 is a circuit implementation of the self-biased inverter circuitry 126 of FIG. 1. The self-biased inverter circuitry 126 includes example capacitors 600, 604, an example resistor 602, and example transistors 606, 608.

The self-biased inverter circuitry 126 inverts and amplifies a dip in the output voltage which is capacitively coupled to the vd node 154 in the current mirror 109 of FIGS. 1 and/or 5. Additionally the self-biased inverter circuitry 126 outputs the inverted amplified dip in output voltage to the vd1 node 154 in the current mirror 208 of FIGS. 2-4. The self-bias inverter circuitry 126 can react and/or identify a voltage dip quickly to jump start the mitigation by applying the amplified output voltage to jumpstart the undershoot mitigation. Although the example of FIG. 6 includes one self-biased inverter circuit with two outputs (e.g., to the two vd and vd1 nodes 154), there may be two instances of the self-biased inverter circuit (e.g., one for the vd node 154 and one for the vd1 node 154).

The capacitor 600 provides a capacitive coupling to the output voltage (Vout) terminal 152. The capacitor 600 includes two terminals. The first terminal of the capacitor 600 is coupled to the output terminal 152. The second terminal is coupled to the control terminals of the transistor 606, 608 and the first terminal of the resistor 602. The resistor 602 includes two terminals. The first terminal of the resistor 602 is coupled to the second terminal of the capacitor 600 and the control terminals of the transistor 606, 608. The second terminal of the resistor 602 is coupled to the second current terminal of the transistor 606, the first current terminal of the transistor 608, and the first terminal of the capacitor 604. The capacitor 604 has two terminals. The first terminal of the capacitor 604 is coupled to the second current terminal of the transistor 606, the first current terminal of the transistor 608, and the second terminal of the resistor 602, the second terminal of the capacitor 604 is coupled to the current mirrors 109 and 208 of FIGS. 1-5. The transistors 606, 608 includes two current terminals and a control terminal. The first current terminal of the transistor 606 is coupled to the output of the buffer 104 (e.g., via the vbg_buff node). The second current terminal of the transistor 606 is coupled to the resistor 602, the capacitor 604 and the first current terminal of the transistor 608. The control terminal of the transistor 606 is coupled to the capacitor 600, the resistor 602, and the control terminal of the transistor 608. The first current terminal of the transistor 608 is coupled to the resistor 602, the capacitor 604 and the second current terminal of the transistor 606. The second current terminal of the transistor 608 is coupled to the ground terminal. The control terminal of the transistor 608 is coupled to the capacitor 600, the resistor 602, and the control terminal of the transistor 606.

Figure 7:
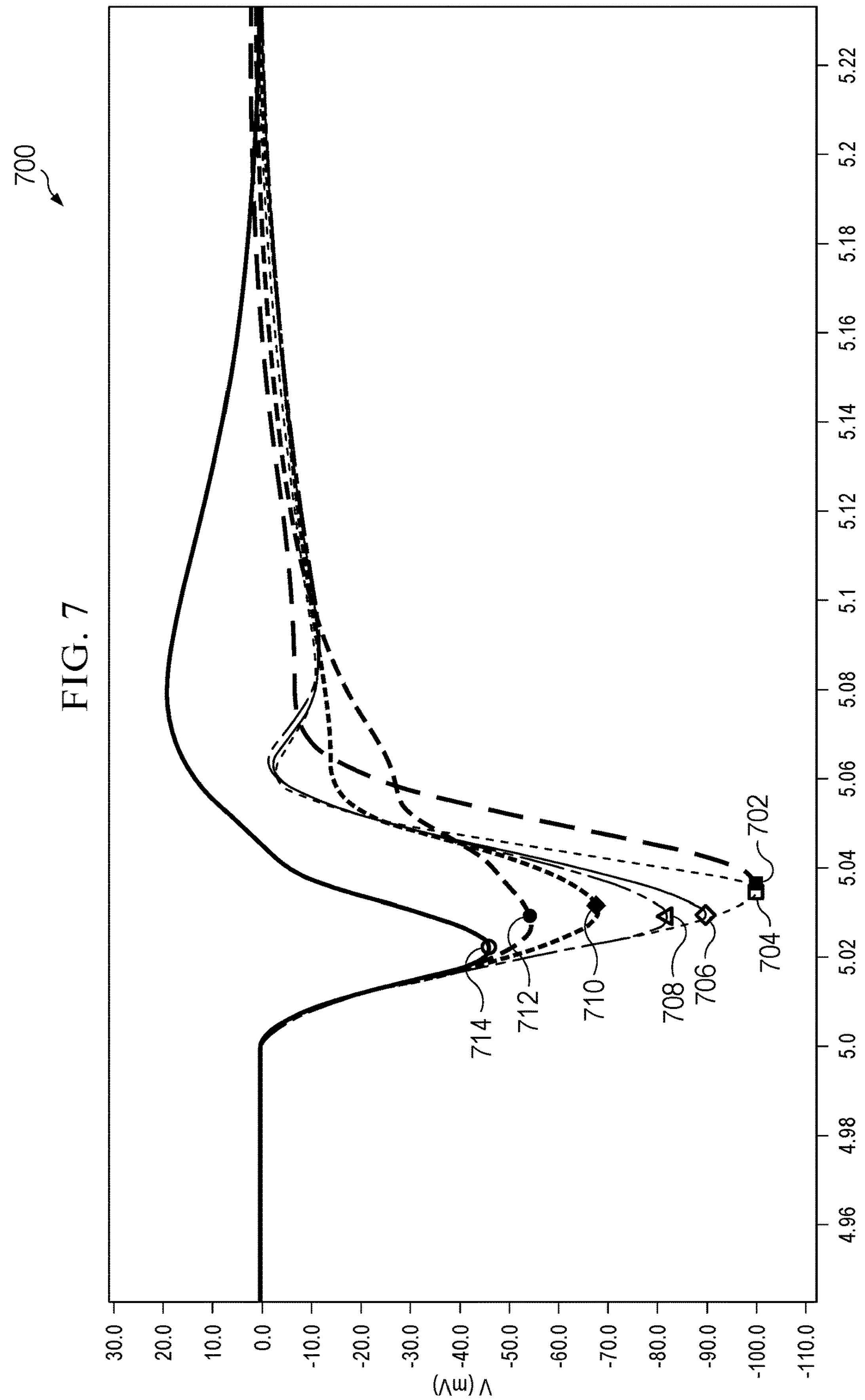
FIG. 7 is an example timing diagram described in conjunction with examples disclosed herein.

FIG. 7 is an example timing diagram 700 that illustrates transient responses to a change in load. The timing diagram 700 includes example plots 702, 704, 706, 708, 710, 712, 714. The plot 702, which results in a 100 millivolts (mV) transient dip, corresponds to a capless regulator without the fast loop circuitry 122, the undershoot detection circuitry 124, and the self-biased inverter circuitry 126 disclosed herein. The plot 704, which results in a 100 mV transient dip, corresponds to a capless regulator without the self-biased inverter circuitry 126 or the use of the transistor 506 of FIG. 5 and using the undershoot detection circuitry 124 of FIG. 2. The plot 706, which results in a 90 mV transient dip, corresponds to a capless regulator without the self-biased inverter circuitry 126 or the use of the transistor 506 of FIG. 5 and using the undershoot detection circuitry 124 of FIG. 3. The plot 708, which results in an 82 mV transient dip, corresponds to a capless regulator without the self-biased inverter circuitry 126 or the use of the transistor 506 of FIG. 5 and using the undershoot detection circuitry 124 of FIG. 4. The plot 710, which results in a 68 mV transient dip, corresponds to a capless regulator without using of the transistor 506 of FIG. 5 and using the undershoot detection circuitry 124 of FIG. 4 and using the self-biased inverter circuitry 126 coupled to the current mirror 208 of FIG. 4. The plot 712, which results in a 54 mV transient dip, corresponds to a capless regulator without using of the transistor 506 of FIG. 5 and using the undershoot detection circuitry 124 of FIG. 4 and using the self-biased inverter circuitry 126 coupled to the current mirrors 109, 208 of FIGS. 1, 4, and/or 5. The plot 714, which results in a 46 mV transient dip, corresponds to the use of all the examples disclosed herein.

An example manner of implementing the regulator 100 of FIG. 1 is illustrated in FIGS. 1-6. However, one or more of the elements, processes and/or devices illustrated in FIG. 1-6 may be combined, divided, re-arranged, omitted, eliminated and/or implemented in any other way.

Further, any component of FIGS. 1-6 may be implemented by hardware, software, firmware and/or any combination of hardware, software and/or firmware. As a result, for example, any of the components of FIGS. 1-6 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of the components of FIGS. 1-6 is/are hereby expressly defined to include a non-transitory computer readable storage device or storage disk such as a memory, a digital versatile disk (DVD), a compact disk (CD), a Blu-ray disk, etc., including the software and/or firmware. Further still, the components of FIGS. 1-6 may include one or more elements, processes and/or devices in addition to, or instead of, those illustrated in FIGS. 1-6, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

From the foregoing, it will be appreciated that example methods, apparatus and articles of manufacture have been disclosed to improve performance of capless regulators. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Descriptors "first," "second," "third," etc. are used herein when identifying multiple elements or components which may be referred to separately. Unless otherwise specified or understood based on their context of use, such descriptors do not impute any meaning of priority, physical order, or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

In the description and in the claims, the terms "including" and "having," and variants thereof are intended to be inclusive in a manner similar to the term "comprising" unless otherwise noted. Unless otherwise stated, "about," "approximately," or "substantially" preceding a value means+/−10 percent of the stated value. In another example, "about," "approximately," or "substantially" preceding a value means+/−5 percent of the stated value. IN another example, "about," "approximately," or "substantially" preceding a value means+/−1 percent of the stated value.

The terms "couple," "coupled," "couples," and variants thereof, as used herein, may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A. Moreover, the terms "couple," "coupled," "couples," or variants thereof, includes an indirect or direct electrical or mechanical connection.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Although not all separately labeled in the FIGS., components or elements of systems and circuits illustrated therein have one or more conductors or terminus that allow signals into and/or out of the components or elements. The conductors or terminus (or parts thereof) may be referred to herein as pins, pads, terminals (including input terminals, output terminals, reference terminals, and ground terminals, for instance), inputs, outputs, nodes, and interconnects.

As used herein, a "terminal" of a component, device, system, circuit, integrated circuit, or other electronic or semiconductor component, generally refers to a conductor such as a wire, trace, pin, pad, or other connector or interconnect that enables the component, device, system, etc., to electrically and/or mechanically connect to another component, device, system, etc. A terminal may be used, for instance, to receive or provide analog or digital electrical signals (or simply signals) or to electrically connect to a common or ground reference. Accordingly, an input terminal or input is used to receive a signal from another component, device, system, etc. An output terminal or output is used to provide a signal to another component, device, system, etc. Other terminals may be used to connect to a common, ground, or voltage reference, e.g., a reference terminal or ground terminal. A terminal of an IC or a PCB may also be referred to as a pin (a longitudinal conductor) or a pad (a planar conductor). A node refers to a point of connection or interconnection of two or more terminals. An example number of terminals and nodes may be shown. However, depending on a particular circuit or system topology, there may be more or fewer terminals and nodes. However, in some instances, “terminal,” “node,” “interconnect,” “pad,” and “pin” may be used interchangeably.

Modifications are possible in the described embodiments, and other embodiments are possible, within the scope of the claims.

Example methods, apparatus, systems, and articles of manufacture corresponding to a voltage regulator are disclosed herein. Further examples and combinations thereof include the following: Example 1 includes a voltage regulator comprising an output terminal, a first transistor including a current terminal and a control terminal, the current terminal of the first transistor coupled to the output terminal, loop circuitry including a second transistor including a control terminal and a current terminal, the current terminal of the second transistor coupled to the control terminal of the first transistor, and undershoot detection circuitry including a third transistor including a first current terminal and a second current terminal, the first current terminal of the third transistor coupled to the output terminal, current mirror circuitry including a terminal coupled to the second current terminal of the third transistor, and inverter circuitry including an input terminal and an output terminal, the input terminal of the inverter circuitry coupled to the terminal of the current mirror circuitry and the second current terminal of the third transistor, the output terminal of the inverter circuitry coupled to the control terminal of the second transistor.

Example 2 includes the voltage regulator of example 1, wherein the current terminal of the first transistor is a first current terminal, the first transistor including a second current terminal coupled to a supply voltage terminal.

Example 3 includes the voltage regulator of example 1, further including an amplifier including a first input terminal, a second input terminal, and an output terminal, the first input terminal of the amplifier coupled to the output terminal of the voltage regulator, the second input terminal of the amplifier coupled to a bandgap terminal.

Example 4 includes the voltage regulator of example 3, wherein the control terminal of the first transistor is coupled to the output terminal of the amplifier.

Example 5 includes the voltage regulator of example 3, further including a fourth transistor including a control terminal and a current terminal, the control terminal of the fourth transistor coupled to the output terminal of the amplifier, the current terminal of the fourth transistor coupled to the output terminal of the voltage regulator.

Example 6 includes the voltage regulator of example 1, wherein the third transistor includes a control terminal, the terminal of the current mirror circuitry is a first terminal, and the current mirror circuitry includes a second terminal, the voltage regulator further including a buffer including an input terminal and an output terminal, the input terminal of the buffer coupled to a bandgap terminal, the undershoot detection circuitry further including a fourth transistor including a first current terminal, a second current terminal, and a control terminal, the first current terminal of the fourth transistor coupled to the output terminal of the buffer, the second current terminal coupled to the second terminal of the current mirror circuitry, and a capacitor including a first terminal and a second terminal, the first terminal of the capacitor coupled to the output terminal of the voltage regulator and the first current terminal of the third transistor, the second terminal of the capacitor coupled to the control terminal of the fourth transistor.

Example 7 includes the voltage regulator of example 1, wherein the undershoot detection circuitry further includes voltage clamp circuitry coupled to the input terminal of the inverter circuitry.

Example 8 includes the voltage regulator of example 7, wherein the voltage clamp circuitry includes a fourth transistor including a first current terminal, a second current terminal, and a control terminal, the first current terminal of the fourth transistor coupled to the input terminal of the inverter circuitry, the second current terminal of the fourth transistor coupled to a ground terminal, the control terminal of the fourth transistor coupled to the input terminal of the inverter circuitry.

Example 9 includes the voltage regulator of example 8, wherein the second current terminal of the fourth transistor is coupled to the ground terminal via a fifth transistor.

Example 10 includes the voltage regulator of example 1, wherein the first transistor is a p-channel transistor, the second transistor is a n-channel transistor, and the third transistor is an p-channel transistor.

Example 11 includes a voltage regulator comprising an output terminal, an amplifier including a first input terminal, a second input terminal, and an output terminal, the first input terminal of the amplifier coupled to the output terminal, the second input terminal of the amplifier coupled to a bandgap terminal, a first transistor including a first current terminal, a second current terminal, and a control terminal, the first current terminal of the first transistor coupled to the output terminal, a second transistor including a first current terminal, a second current terminal, and a control terminal, the first current terminal of the second transistor coupled to the second current terminal of the first transistor, the second current terminal of the second transistor coupled to a ground terminal, a third transistor including a first current terminal, a second current terminal, and a control terminal, the first current terminal of the third transistor coupled to the control terminal of the third transistor, the second current terminal of the third transistor coupled to the ground terminal, and the control terminal of the third transistor coupled to the control terminal of the second transistor, and inverter circuitry including an input terminal and an output terminal, the input terminal of the inverter circuitry coupled to the output terminal, the output terminal of the inverter circuitry coupled to the control terminals of the second and third transistors.

Example 12 includes the voltage regulator of example 11, wherein the inverter circuitry includes a fourth transistor including a first current terminal, a second current terminal, and a control terminal, the first current terminal coupled to a buffer, and a fifth transistor including a first current terminal, a second current terminal, and a control terminal, the first current terminal of the fifth transistor coupled to the second current terminal of the fourth transistor, the second current terminal of the fifth transistor coupled to the ground terminal, the control terminal of the fifth transistor coupled to the control terminal of the fourth transistor.

Example 13 includes the voltage regulator of example 12, wherein the inverter circuitry further includes a first capacitor including a first terminal and a second terminal, the first terminal of the first capacitor coupled to the output terminal, the second terminal of the first capacitor coupled to the control terminals of the fourth and fifth transistors, and a second capacitor including a first terminal and a second terminal, the first terminal of the second capacitor coupled to the second current terminal of the fourth transistor and the first current terminal of the fifth transistor, the second terminal of the second capacitor coupled to the control terminals of the second and third transistors.

Example 14 includes the voltage regulator of example 13, wherein the inverter circuitry further includes a resistor with a first terminal and a second terminal, the first terminal of the resistor coupled to the control terminals of the fourth and fifth transistors and the second terminal of the first capacitor, the second terminal of the resistor coupled to the second current terminal of the fourth transistor, the first current terminal of the fifth transistor, and the first terminal of the second capacitor.

Example 15 includes the voltage regulator of example 11, further including undershoot detection circuitry coupled to the output terminal of the inverter circuitry.

Example 16 includes a voltage regulator comprising an output terminal, an amplifier including a first input terminal, a second input terminal, and an output terminal, the first input terminal of the amplifier coupled to an output terminal, the second input terminal of the amplifier coupled to a bandgap terminal, a first transistor including a current terminal and a control terminal, the current terminal of the first transistor coupled to the output terminal, a second transistor including a first current terminal, a second current terminal, and a control terminal, the first current terminal of the second transistor coupled to a supply voltage terminal, the second current terminal of the second transistor coupled to the output terminal, loop detection circuitry including a third transistor including a first current terminal, a second current terminal, and a control terminal, the first current terminal of the third transistor coupled to the supply voltage terminal, the second current terminal of the third transistor coupled to the control terminal of the first transistor, and a fourth transistor including a first current terminal, a second current terminal, and a control terminal, the first current terminal of the fourth transistor coupled to the control terminal of the second transistor, the second current terminal of the fourth transistor coupled to a ground terminal, and undershoot detection circuitry including a first terminal and a second terminal, the first terminal coupled to the output terminal and the second terminal coupled to the control terminals of the third and fourth transistors.

Example 17 includes the voltage regulator of example 16, wherein the first current terminal of the third transistor is coupled to the supply voltage terminal via a fifth transistor.

Example 18 includes the voltage regulator of example 16, wherein the second current terminal of the fourth transistor is coupled to the ground terminal via a fifth transistor.

Example 19 includes the voltage regulator of example 16, wherein the loop detection circuitry further includes a fifth transistor including a first current terminal, a second current terminal, and a control terminal, the first current terminal of the fifth transistor coupled to the first current terminal of the third transistor, the second current terminal of the fifth transistor coupled to the ground terminal, and the control terminal of the fifth transistor coupled to the first current terminal of the fifth transistor.

Example 20 includes the voltage regulator of example 16, wherein the first transistor is a p-channel transistor, the second transistor is an p-channel transistor, the third transistor is a n-channel transistor, the fourth transistor is a n-channel transistor.

What is claimed is:

1. A voltage regulator comprising:
- an output terminal;
- a first transistor including a current terminal and a control terminal, the current terminal of the first transistor coupled to the output terminal;
- loop circuitry including a second transistor including a control terminal and a current terminal, the current terminal of the second transistor coupled to the control terminal of the first transistor; and
- undershoot detection circuitry including:
  - a third transistor including a first current terminal and a second current terminal, the first current terminal of the third transistor coupled to the output terminal;
  - current mirror circuitry including a terminal coupled to the second current terminal of the third transistor; and
  - inverter circuitry including an input terminal and an output terminal, the input terminal of the inverter circuitry coupled to the terminal of the current mirror circuitry and the second current terminal of the third transistor, the output terminal of the inverter circuitry coupled to the control terminal of the second transistor.

2. The voltage regulator of claim 1, wherein the current terminal of the first transistor is a first current terminal, the first transistor including a second current terminal coupled to a supply voltage terminal.

3. The voltage regulator of claim 1, further including an amplifier including a first input terminal, a second input terminal, and an output terminal, the first input terminal of the amplifier coupled to the output terminal of the voltage regulator, the second input terminal of the amplifier coupled to a bandgap terminal.

4. The voltage regulator of claim 3, wherein the control terminal of the first transistor is coupled to the output terminal of the amplifier.

5. The voltage regulator of claim 3, further including a fourth transistor including a control terminal and a current terminal, the control terminal of the fourth transistor coupled to the output terminal of the amplifier, the current terminal of the fourth transistor coupled to the output terminal of the voltage regulator.

6. The voltage regulator of claim 1, wherein the third transistor includes a control terminal, the terminal of the current mirror circuitry is a first terminal, and the current mirror circuitry includes a second terminal, the voltage regulator further including:
- a buffer including an input terminal and an output terminal, the input terminal of the buffer coupled to a bandgap terminal;
- the undershoot detection circuitry further including:
  - a fourth transistor including a first current terminal, a second current terminal, and a control terminal, the first current terminal of the fourth transistor coupled to the output terminal of the buffer, the second current terminal coupled to the second terminal of the current mirror circuitry; and a capacitor including a first terminal and a second terminal, the first terminal of the capacitor coupled to the output terminal of the voltage regulator and the first current terminal of the third transistor, the second terminal of the capacitor coupled to the control terminal of the fourth transistor.

7. The voltage regulator of claim 1, wherein the undershoot detection circuitry further includes voltage clamp circuitry coupled to the input terminal of the inverter circuitry.

8. The voltage regulator of claim 7, wherein the voltage clamp circuitry includes a fourth transistor including a first current terminal, a second current terminal, and a control terminal, the first current terminal of the fourth transistor coupled to the input terminal of the inverter circuitry, the second current terminal of the fourth transistor coupled to a ground terminal, the control terminal of the fourth transistor coupled to the input terminal of the inverter circuitry.

9. The voltage regulator of claim 8, wherein the second current terminal of the fourth transistor is coupled to the ground terminal via a fifth transistor.

10. The voltage regulator of claim 1, wherein the first transistor is a p-channel transistor, the second transistor is a n-channel transistor, and the third transistor is an p-channel transistor.

11. A voltage regulator comprising:

an output terminal;

an amplifier including a first input terminal, a second input terminal, and an output terminal, the first input terminal of the amplifier coupled to the output terminal, the second input terminal of the amplifier coupled to a bandgap terminal;

a first transistor including a first current terminal, a second current terminal, and a control terminal, the first current terminal of the first transistor coupled to the output terminal;

a second transistor including a first current terminal, a second current terminal, and a control terminal, the first current terminal of the second transistor coupled to the second current terminal of the first transistor, the second current terminal of the second transistor coupled to a ground terminal;

a third transistor including a first current terminal, a second current terminal, and a control terminal, the first current terminal of the third transistor coupled to the control terminal of the third transistor, the second current terminal of the third transistor coupled to the ground terminal, and the control terminal of the third transistor coupled to the control terminal of the second transistor; and inverter circuitry including an input terminal and an output terminal, the input terminal of the inverter circuitry coupled to the output terminal, the output terminal of the inverter circuitry coupled to the control terminals of the second and third transistors.

12. The voltage regulator of claim 11, wherein the inverter circuitry includes:

a fourth transistor including a first current terminal, a second current terminal, and a control terminal, the first current terminal coupled to a buffer; and a fifth transistor including a first current terminal, a second current terminal, and a control terminal, the first current terminal of the fifth transistor coupled to the second current terminal of the fourth transistor, the second current terminal of the fifth transistor coupled to the ground terminal, the control terminal of the fifth transistor coupled to the control terminal of the fourth transistor.

13. The voltage regulator of claim 12, wherein the inverter circuitry further includes:

a first capacitor including a first terminal and a second terminal, the first terminal of the first capacitor coupled to the output terminal, the second terminal of the first capacitor coupled to the control terminals of the fourth and fifth transistors; and a second capacitor including a first terminal and a second terminal, the first terminal of the second capacitor coupled to the second current terminal of the fourth transistor and the first current terminal of the fifth transistor, the second terminal of the second capacitor coupled to the control terminals of the second and third transistors.

14. The voltage regulator of claim 13, wherein the inverter circuitry further includes a resistor with a first terminal and a second terminal, the first terminal of the resistor coupled to the control terminals of the fourth and fifth transistors and the second terminal of the first capacitor, the second terminal of the resistor coupled to the second current terminal of the fourth transistor, the first current terminal of the fifth transistor, and the first terminal of the second capacitor.

15. The voltage regulator of claim 11, further including undershoot detection circuitry coupled to the output terminal of the inverter circuitry.

16. A voltage regulator comprising:

an output terminal;

an amplifier including a first input terminal, a second input terminal, and an output terminal, the first input terminal of the amplifier coupled to an output terminal, the second input terminal of the amplifier coupled to a bandgap terminal;

a first transistor including a current terminal and a control terminal, the current terminal of the first transistor coupled to the output terminal;

a second transistor including a first current terminal, a second current terminal, and a control terminal, the first current terminal of the second transistor coupled to a supply voltage terminal, the second current terminal of the second transistor coupled to the output terminal;

loop detection circuitry including:

a third transistor including a first current terminal, a second current terminal, and a control terminal, the first current terminal of the third transistor coupled to the supply voltage terminal, the second current terminal of the third transistor coupled to the control terminal of the first transistor; and a fourth transistor including a first current terminal, a second current terminal, and a control terminal, the first current terminal of the fourth transistor coupled to the control terminal of the second transistor, the second current terminal of the fourth transistor coupled to a ground terminal; and undershoot detection circuitry including a first terminal and a second terminal, the first terminal coupled to the output terminal and the second terminal coupled to the control terminals of the third and fourth transistors.

17. The voltage regulator of claim 16, wherein the first current terminal of the third transistor is coupled to the supply voltage terminal via a fifth transistor.

18. The voltage regulator of claim 16, wherein the second current terminal of the fourth transistor is coupled to the ground terminal via a fifth transistor.

19. The voltage regulator of claim 16, wherein the loop detection circuitry further includes a fifth transistor including a first current terminal, a second current terminal, and a control terminal, the first current terminal of the fifth transistor coupled to the first current terminal of the third transistor, the second current terminal of the fifth transistor coupled to the ground terminal, and the control terminal of the fifth transistor coupled to the first current terminal of the fifth transistor.

20. The voltage regulator of claim 16, wherein the first transistor is a p-channel transistor, the second transistor is an p-channel transistor, the third transistor is a n-channel transistor, the fourth transistor is a n-channel transistor.

* * * * *